United States Patent [19]

Bhakta

[11] Patent Number: 5,935,544

[45] Date of Patent: Aug. 10, 1999

[54] MODERATE EXCESS NITROGEN BRAUN PURIFIER™ PROCESS AND METHOD FOR RETROFITTING NON-BRAUN PURIFIER™ AMMONIA PLANTS

[75] Inventor: Mukund Bhakta, Cerritos, Calif.

[73] Assignee: Brown & Root, Inc., Houston, Tex.

[21] Appl. No.: 08/833,598

[22] Filed: Apr. 7, 1997

Related U.S. Application Data

[60] Provisional application No. 60/017,836, Jun. 6, 1996, and provisional application No. 60/026,569, Sep. 17, 1997.

[51] Int. Cl.$^6$ ........................................... C01C 1/04
[52] U.S. Cl. ........................................... 423/359
[58] Field of Search ........................................... 423/359

[56] References Cited

U.S. PATENT DOCUMENTS

| | | |
|---|---|---|
| 3,442,613 | 5/1969 | Grotz . |
| 4,296,085 | 10/1981 | Banquy . |
| 4,383,982 | 5/1983 | Pinto . |
| 4,409,196 | 10/1983 | Skinner et al. . |
| 4,613,492 | 9/1986 | Winter . |
| 4,681,745 | 7/1987 | Pinto . |
| 4,699,772 | 10/1987 | de Lathouder . |
| 4,780,298 | 10/1988 | Kowal . |
| 4,925,456 | 5/1990 | Egglestone . |
| 4,981,669 | 1/1991 | Pinto ...................................... 423/359 |

OTHER PUBLICATIONS

John H. Perry, *Chemical Engineers' Handbook*, Fourth Edition, McGraw Hill Book Co., p. 13–2, 1963.

*Primary Examiner*—Wayne Langel

[57] ABSTRACT

The present invention is a moderate excess nitrogen Braun Purifier™ process, wherein has been found an unexpected improvement in capacity and efficiency of operation of ammonia plants designed without the Braun Purifier™ process. In addition, the refrigeration necessary for the fractionation and/or separation of the desired hydrogen and nitrogen from the undesired methane and inerts can by provided by prior art methods or by the novel methods described herein.

3 Claims, 9 Drawing Sheets

MODERATE EXCESS NITROGEN BRAUN PURIFIER™ PROCESS AND METHOD FOR RETROFITTING NON-BRAUN PURIFIER™ AMMONIA PLANTS

This application claims benefit of and incorporates herein prior applications Ser. No. 60/017,836, filed Jun. 6, 1996, and Ser. No. 60/026,569, filed Sep. 17, 1997.

BACKGROUND OF THE INVENTION

The present invention relates to ammonia synthesis gas purification and increasing the capacity of a non-Braun Purifier™ ammonia plant by use of the Braun Purifier™.

Since the advantageous use of cryogenic purification of ammonia synthesis gas as described in U.S. Pat. No. 3,442,613 (Grotz, Jr., the basis of the Braun Purifier™ process), it has been a goal to further advance the art of hydrogen to nitrogen ratio control and/or removal of methane and/or inerts such as argon by way of cryogenic fractionation. However, it is the overwhelming choice of non-Braun Purifier™ plants to install non-cryogenic separation methods of controlling hydrogen to nitrogen ratios and/or inerts reduction for ammonia synthesis gas, although the advantages of such cryogenic purification are well proven, evidenced by the use of the Braun Purifier™ process in about one third of the world's ammonia production capacity for high efficiency plants. The very simple and inexpensive construction of the Braun Purifier™ process is shown in U.S. Pat. No. 3,443,613 within the broken lines of FIG. 2 of that invention. The process of U.S. Pat. No. 3,442,613 creates an ammonia synthesis gas upstream of the Braun Purifier™ which preferably contains about 150% excess nitrogen over the 3:1 hydrogen to nitrogen ratio required for efficient operation of the ammonia conversion synloop. This excess nitrogen, with the rest of the CO2- and CO-free synthesis gas, is auto-refrigerated by flash expansion of rectified liquid condensate from that synthesis gas and by expander expansion of the CO2- and CO-free synthesis gas, partly cooled by autorefrigeration.

Those skilled in the art understand the exceptional operation and process of the Braun Purifier. U.S. Pat. No. 4,409,196 describes the process improvement as follows:

"It will be recognized that in the application of partial oxidation processes and of the autothermic steam reforming processes as outlined above, the employment of air as the internal oxidant is restricted by the degree that the resultant nitrogen present is acceptable in the product gas".

"Thus in the usual natural gas based ammonia process, the amount of air admitted to the secondary reformer is limited to the supply of nitrogen required for the ammonia synthesis step. Also in the partial oxidation and autothermic reforming operations, recourse to at least partial supply of the oxidant in the form of substantially pure oxygen is usually necessary, except when the process is to be used only to produce a low grade fuel gas. The necessity for the supply of substantially pure oxygen means that an air separation plant must be provided. The additional capital and running costs incurred thereby results in such processes appearing less attractive as a means of producing hydrogen rich gases except when the feed hydrocarbon is very cheap or complete flexibility of feedstock source is desired".

"One exception to this restriction is in the Braun "Purified" Process for the Manufacture of ammonia disclosed in U.S. Pat. No. 3,442,613. In the process disclosed a synthesis gas stream is obtained by primary reforming methane or other hydrocarbon with steam followed by a secondary reforming in which air is present in an amount to provide a stoichiometric excess of nitrogen from 2 to 150 mole percent based upon that needed for the synthesis gas. The excess nitrogen is condensed downstream of the reformer." (col. 2, ll. 21–51)

The Braun Purifier process is the only commercially important process for preparation of synthesis gas with excess nitrogen removed by the simple combination of gas expansion, auto-refrigeration and cryogenic fractionation. That process obtains the required 3:1 hydrogen to nitrogen ratio most efficient for use in the synthesis loop with additional benefit of reducing purge gas volume by obtaining extremely low levels of methane and inerts from the Braun Purifier step. In the past, the Braun Purifier process has only been used in so-called "grass roots" plants, i.e., plants for which the large and expensive equipment for primary and secondary reformers, shift reactor, carbon dioxide removal, methanation, compression and heat recovery are integrated in a design with the autorefrigeration and cryogenic fractionation. It is unknown to have tried expansion of an installed Braun Purifier process without the assistance of the owners of that process. No substantial expansion of such an installed process has previously been known without changing the multi-stream platefin exchangers and at least some portion of the cryogenic fractionation column and/or condenser, a process requiring the expertise of the owners of the process, presently Brown & Root, Inc.

U.S. Pat. No. 4,681,745 describes production of ammonia by the sequence of steam hydrocarbon primary reforming, secondary reforming with air, carbon monoxide shift conversion, carbon oxides removal and catalytic ammonia synthesis is improved by using oxygen-enriched air at secondary reforming and/or by operating the reforming steps so that 5–15% by carbon atoms of the starting hydrocarbon is not reformed but is purged from the synthesis. The oxygen enriched air can be the by-product of a simple air separation plant producing nitrogen, and the nitrogen can be used to aid start-up or shut-down of the process or to keep the process plant in a hot stand-by condition.

U.S. Pat. No. 4,383,982 describes an ammonia production process whereby a hydrocarbon steam mixture is preheated and reacted in an adiabatic catalyst bed, the resulting methane-containing gas is reacted with air to introduce more than 1 N(2) per 3H(2) and the purified gas is passed to ammonia synthesis in admixture with a hydrogen-rich stream separated at 80 from reacted synthesis gas, and the rate of flow of that stream is controlled so that the H(2):dN (2) ratio of the gas entering the synthesis catalyst is in the range 1.0 to 2.5. Preferably methane is purged at 86 to the extent of 5–15% of the hydrocarbon feedstock.

U.S. Pat. No. 4,296,085 describes a process to produce ammonia from a hydrocarbon feedstock, involving basically the following steps: dividing the feedstock into two fractions, subjecting the first fraction to a primary steam reforming reaction, at high pressure and moderate temperature, combining the effluent from the primary reforming with the second fraction of the feedstock, and subjecting the mixture thereof to a secondary adiabatic reforming reaction with an amount of air in excess to that needed for ammonia synthesis, subjecting the synthesis gas produced to a CO shift conversion reaction, and then to CO(2) removal by solvent scrubbing, while the gas released by pressure letdown of said solvent is preferably recycled back upstream of the secondary reforming, methanation of the residual carbon oxides, removing the excess nitrogen present in the gas by cryogenic separation, compressing and feeding the final synthesis gas into an ammonia synthesis loop, recycling the purge gas from said ammonia synthesis loop to upstream the cryogenic separation.

U.S. Pat. No. 4,925,456 describes a plurality of double pipe heat exchangers which are used for primary reforming in a combined primary and secondary reforming process and apparatus.

U.S. Pat. No. 4,780,298 describes an ammonia production process in which excess nitrogen and traces of carbon oxides are removed from raw ammonia synthesis gas firstly by application of partial condensation and secondly by application of washing action provided by carbon-oxides-free liquefied gas, rich in nitrogen, which is derived from a cryogenic process used preferentially for separation of hydrogen from the ammonia synthesis loop purge gas as produced in processes which use excess of nitrogen above stoichiometric requirements in the circulating gas in the synthesis loop.

U.S. Pat. No. 4,409,196 describes a process for producing a gas stream for ammonia synthesis in which a gas stream containing hydrogen and nitrogen in excess of ammonia synthesis requirements, e.g. obtained by partial oxidation of natural gas, coal or oil, is treated to remove other component gases and thereafter subjected to a separation stage, e.g. in a cryogenic separator, to separate a hydrogen-nitrogen stream having the desired hydrogen:nitrogen ratio which is injected into the reactor for ammonia synthesis, and a waste nitrogen stream which may be utilized in power generation or washing stages.

U.S. Pat. No. 4,613,492 describes a process for the production of ammonia wherein excess nitrogen is fed to the secondary reformer and a cryogenic unit is employed to obtain a nitrogen-rich stream which is recycled at least in part to the cryogenic unit.

U.S. Pat. No. 4,699,772 describes a process for preparing ammonia from hydrogen and nitrogen wherein the synthesis gas mixture is produced by partial oxidation, in the presence of a suitable catalyst, at a pressure of from 35 to 150 bar and temperatures of from 850 deg. –1200 deg. C. at the exit of the partial oxidation zone, followed by removal of the carbon oxides and water from the gaseous effluent of the partial oxidation zone. The air used for the catalytic partial oxidation is supplied in such a quantity that the molar ratio of hydrogen to nitrogen in the synthesis gas is between 2.5 and 3 to 1 and is enriched with such a quantity of oxygen that the total quantity of oxygen is sufficient to effect the required degree of hydrocarbon conversion.

It will be seen that the prior art has striven mightily to meet the following problem without benefit of the Braun Purifier process. If a hydrogen to nitrogen ratio of 3:1 is to be achieved far downstream at the ammonia synthesis loop without nitrogen separation or autothermal reforming, the heat input required at the secondary reforming step is far from adequate if non-enriched air is used for the high pressure oxidation at that stage. The end result is that (1) nitrogen removal must be achieved in some manner or (2) heat transfer to the secondary reformer must be delivered in some way other than directly by non-enriched air oxidation.

The method of obtaining projects for which an ammonia synthesis design will be paid for is a complex one, but at the same time is quite simple. A buying decision must balance technical superiority with price. Since 1990, the Braun Purifier process has been installed in four ammonia plants in China, each with capacities of over 1500 metric tons per day. The process is substantially the same as that shown in U.S. Pat. No. 3,442,613, which is incorporated herein. Obviously, the overwhelming tendency of this art is to resist change as being a risk to operational efficiency and safety.

U.S. Pat. Nos. 4,409,196 and 4,780,298 use a liquid nitrogen wash stream generated external to the synthesis gas loop to reduce excess nitrogen. U.S. Pat. Nos. 4,699,772 and 4,681,745 reduce excess nitrogen by using enriched air in the secondary reforming step, again requiring an external refrigeration and separation process to produce synthesis gas with a proper hydrogen to nitrogen ratio. U.S. Pat. Nos. 4,613,492 and 4,296,085 describe using a recycle stream of ammonia synthesis loop purge gas to adjust that ratio. U.S. Pat. No. 4,383,982 operates a synthesis loop at a hydrogen to nitrogen ratio less than 3.0 with recycle streams and purge gas stream separation. U.S. Pat. No. 4,925,456 is exemplary of heat transfer equipment attempting to transfer heat from the secondary reforming step to the primary reforming step to achieve an autothermal reforming. Such autothermal reforming has been found to fall short of the overall process heating requirements for making a synthesis gas of proper hydrogen to nitrogen ratio without having excess nitrogen.

Although the prior art indicates certain advantages of the manipulation of excess nitrogen in the synthesis gas stream, the advantages are not such that they indicate an organized direction to the skilled person.

SUMMARY OF THE INVENTION

The present invention is a moderate excess nitrogen Braun Purifier™ process for application to ammonia plants designed without the Braun Purifier™ process to obtain an up to and surpassing 10 percent increase in ammonia production capacity. It had not been thought possible to use the Purifier process to such a non-Purifier process plant without extensive replacement of most of the processing equipment such as furnaces, large, high pressure reactors and other related equipment. Such replacement is certainly the case when excess nitrogen of about 100–150 percent is had in the synthesis gas after secondary reforming.

An unexpected improvement in capacity and efficiency of operation have been discovered without extensive replacement or modification of equipment using a moderate range of excess nitrogen, although the reduced nitrogen reduces fractionation efficiency in the Purifier column and higher levels of methane and inerts pass to the synthesis loop than in Braun Purifier plants operating at 150 percent excess nitrogen. Such a trade is highly desirable and unexpectedly advantageous in light of the low cost and simplicity of changes required to modify the existing plant to obtain a dramatic change in capacity. In alternate embodiments, the refrigeration necessary for the Purifier fractionation and/or separation of the desired hydrogen and nitrogen from the undesired nitrogen, methane and inerts can by provided by process stream expansion and autorefrigeration or by the following novel method.

If the air compressor has such volumetric capacity that it can supply the excess nitrogen, i.e., excess air, with additional capacity in reserve, it is preferred to operate the air compressor at full capacity to obtain an air refrigeration stream. The air refrigeration stream is expanded and partially condensed to provide a multi-component refrigeration stream. The multi-component refrigeration stream is used by indirect heat transfer to provide refrigeration to the Purifier separation stages. Thus, as can be seen in U.S. Pat. No. 3,442,613, the expander for the process stream may either be eliminated or reduced in size as the external multi-component refrigeration stream compensates for the autorefrigeration previously supplied.

An embodiment of the present invention comprises an existing ammonia synthesis plant in the range of 500 to 2500 metric tons per day designed for the non-Purifier process. Such plants comprise an air compressor for air supplied to the secondary reforming step. It is almost inevitable that the frame size of the air compressor is substantially larger than the actual required volumetric capacity of the air compressor. The present invention also comprises retaining an existing air compressor frame and for minimal cost expanding the volumetric capacity to contribute the additional air needed for overall ammonia production by the present invention.

Alternately, a low moderate excess nitrogen level in the process syngas can be adapted to achieve substantially the same results with a combination of expansions and phase separations. In yet another embodiment with a higher moderate excess nitrogen level in the process syngas, a short fractionation/rectification section is included with the process expansions and phase separations to effect a complete removal of methane and about 80% of inerts from the syngas stream entering the process of the present invention.

An alternate embodiment of the present invention includes a novel condensation of about less than 10 mole percent, and preferably about 1 mole percent of the synthesis gas stream as it exits the first one of two multi-stream platefin exchangers used for autorefrigeration of the process stream prior to introduction to the Purifier column. Performing as little as one mole percent condensation on the process gas in the first multi-stream platefin exchanger frees the "pinched" operation of that exchanger. With the unloading of the condensation duty from the second multi-stream platefin exchanger, the efficient distribution of refrigeration from cold process streams requires a lower pressure drop across the expander to achieve the objects of the moderate excess nitrogen Purifier process. In the example below, the pressure drop was reduced by about one third. The savings in re-compression utilities for the synthesis loop is significant. In addition, the number of theoretical stages required in the Purifier fractionation column is reduced from about 19 to about 9, thereby obtaining the substantially the same separation and recovery to the synthesis gas for the ammonia synthesis loop.

DETAILED DESCRIPTION OF THE INVENTION

The technology disclosed below creates the opportunity to increase plant capacity expansion and efficiency, especially and preferably in an existing non-Purifier ammonia plant, with the cryogenic separation steps typical of the Purifier process without substantial change to the size of most of the process equipment.

It is known that non-Purifier ammonia plants produce a synthesis gas after shift conversion, carbon dioxide removal and methanation with about 1–1.3 mole percent methane. This is in contrast with the relatively higher comparable stream composition of about 2–2.5 mole percent methane for the Purifier ammonia plants. It has not previously been considered a novel or unexpected advantage to apply the Purifier process to a synthesis gas with the lower methane content. It has been unexpected to find that the Purifier process applied to the low methane content synthesis gases with moderate excess nitrogen and external or autorefrigeration results in a synthesis gas with sufficiently low inerts that a significant increase in synthesis capacity may be obtained or that substantial reduction in synloop pressure may obtained alternately or in combination with increased synthesis capacity.

EXAMPLE 1
External Air Refrigeration Loop

Figure 2:
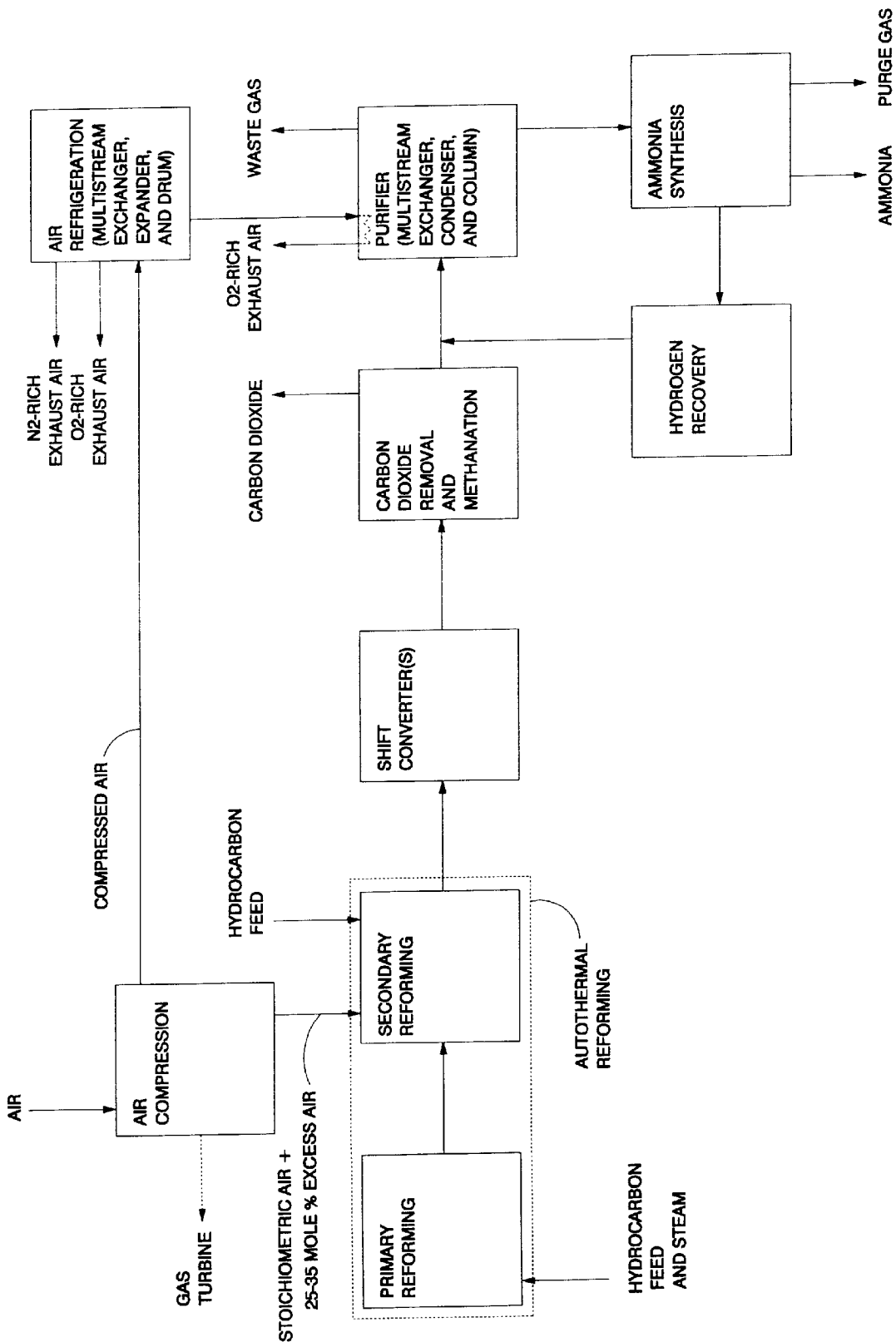
FIG. 2 is a flow diagram of the present invention improvement of the Purifier process, whereby a compressed air stream is auto-refrigerated by expander expansion to provide a refrigeration stream to the Purifier process, i.e. the phase separation and/or fractionation separation of excess nitrogen, methane and inerts from the desired relative ratio composition of hydrogen to nitrogen for feed to the ammonia conversion synthesis loop.
Figure 4:
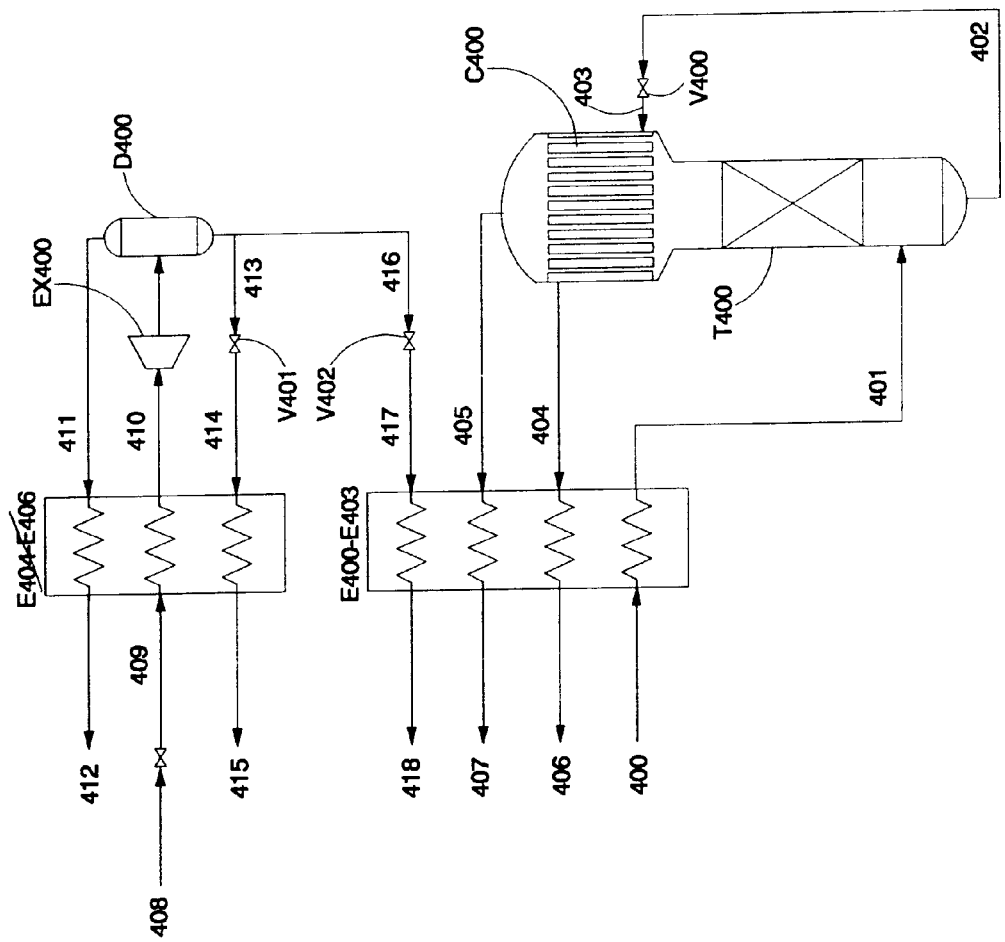
FIG. 4 shows the AIR REFRIGERATION and PURIFIER processes shown in FIG. 2.

The present invention is now discussed with reference to FIGS. 2 and 4. FIG. 2 shows the entire ammonia synthesis gas production, purification and conversion in a single flow diagram. A broken line is shown around the Primary and Secondary Reforming steps indicating the potential for applying autothermal reforming with oxygen-enriched air. The term "air" as used herein will have its usual meaning of typical ambient composition. The term "enriched air" will mean an air-based product stream wherein the oxygen content comprised from 20–100 mole percent of that product stream. The term "nitrogen-enriched air" will mean an air-based product stream wherein the nitrogen content comprises 80–100 mole percent of that product stream. It has been found that all three of these air-based product streams may be advantageously used in the various embodiments of the present invention. For the moderate excess nitrogen Purifier process of the present invention, enriched air will be required for autothermal reforming to provide sufficient process heating for the primary and secondary reforming. The clear advantage of operating the Purifier process with 50% excess nitrogen is that air may alone be used as the oxygen containing gas in the secondary reformer for combustion and partial oxidation of hydrocarbon feed to then completely supply the heat necessary for the primary reforming step.

Figure 1:
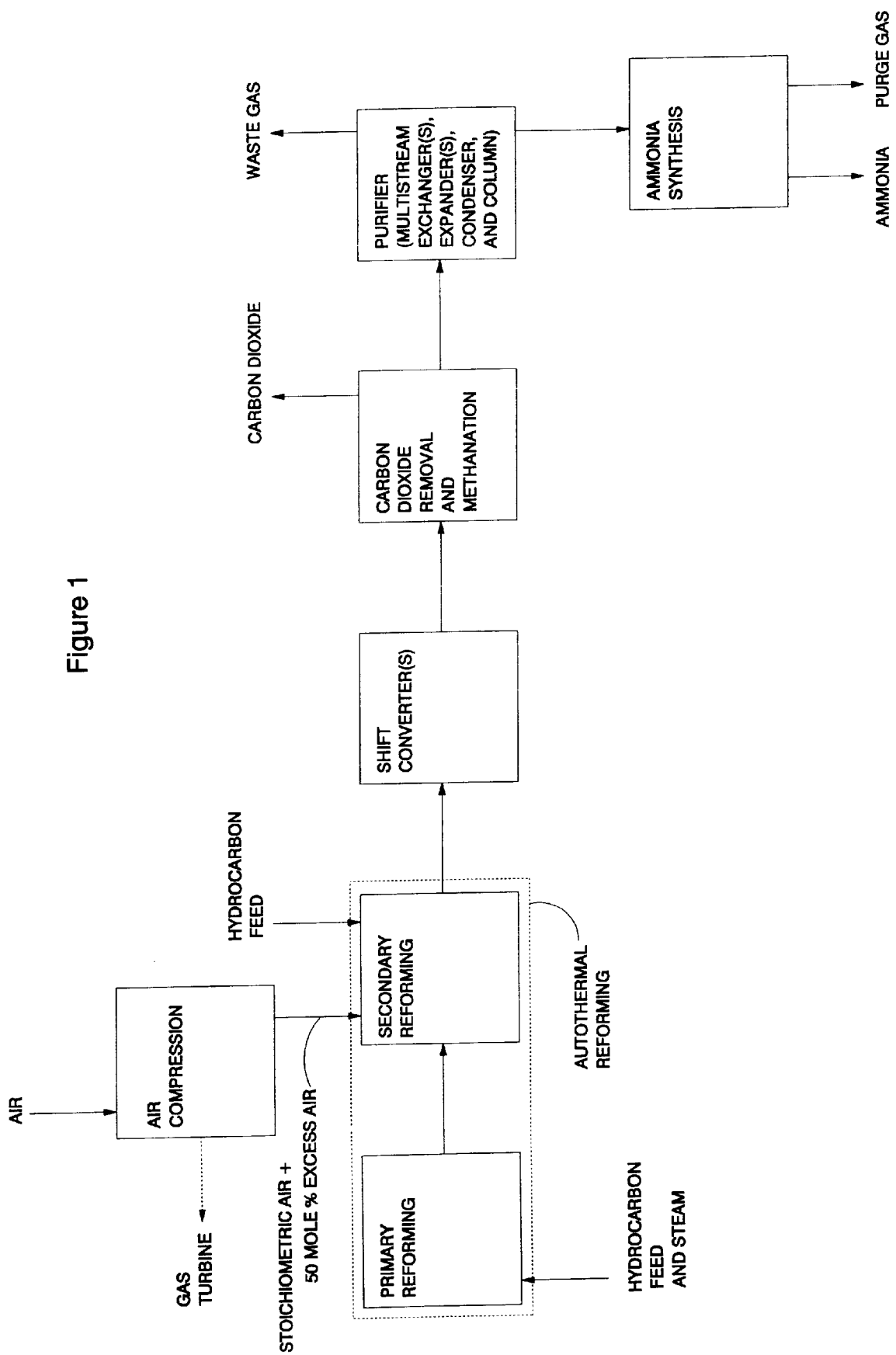
FIG. 1 is a flow diagram of the location of the prior art Braun Purifier™ (hereafter referred to as the Purifier) process in the production of ammonia synthesis gas and the process stream inputs and outputs.
Figure 3:
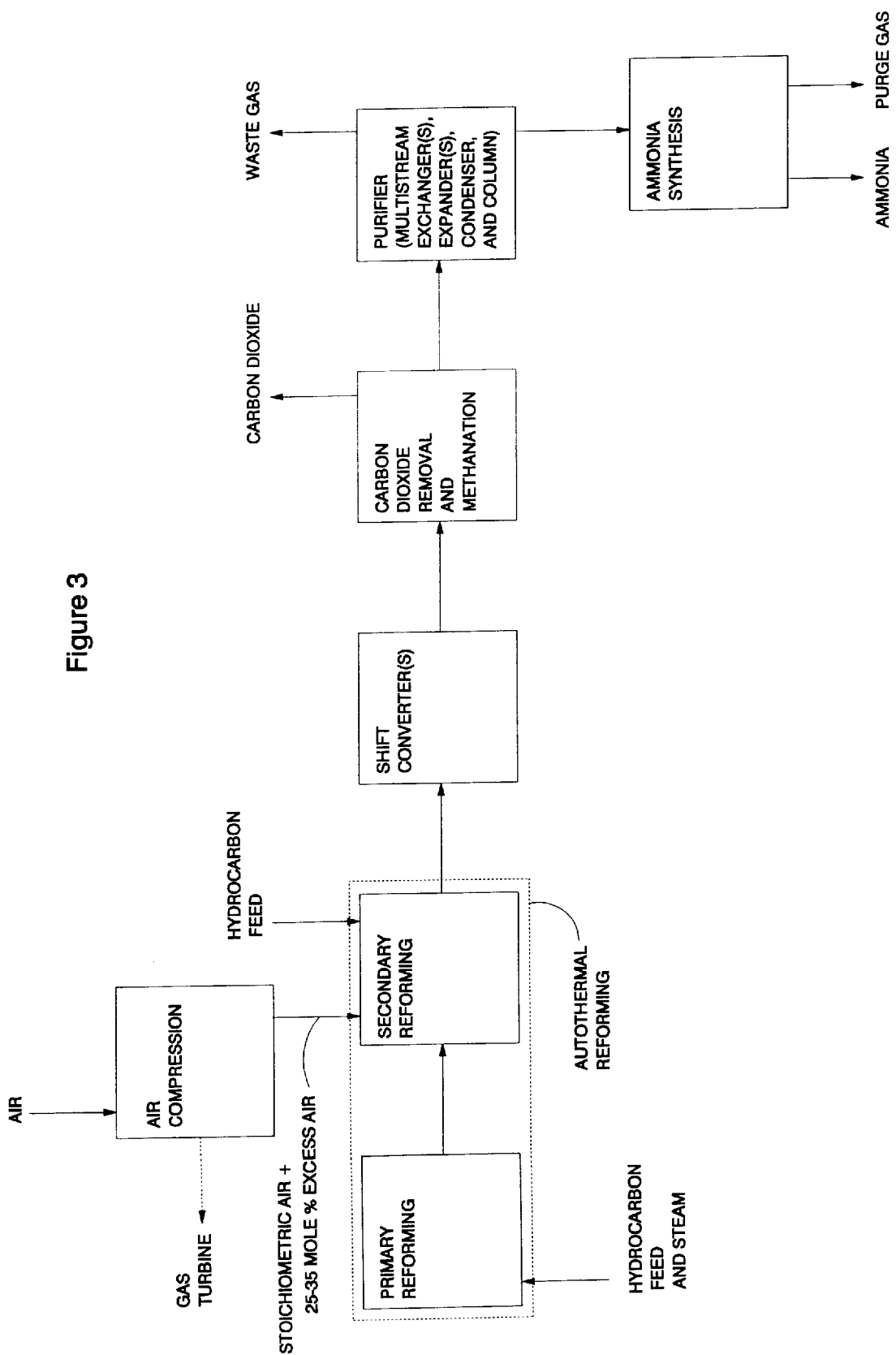
FIG. 3 is a flow diagram of another embodiment of the present invention improvement of the Purifier process adapted to operate with 25–35% excess nitrogen (designated in the flow diagram as 25–25% EXCESS AIR although such excess nitrogen may be introduced in other, prior art methods).

In FIGS. 1, 2 and 3, the term "STOICHIOMETRIC AIR" means that amount of air, enriched air or nitrogen-enriched air which will contain sufficient nitrogen at the introduction to the AMMONIA SYNTHESIS step in relation to the hydrogen to form a stream comprising a hydrogen to nitrogen ratio of about 3:1. Also in FIGS. 2 and 3, the term "25–35 MOLE % EXCESS AIR" is a preferred range of process nitrogen input such that an amount of air, enriched air or nitrogen-enriched air is added such that at the introduction of the process stream to the PURIFIER process step, that process stream will comprise about 20–40 mole percent, although more preferably 25–35 mole percent, more nitrogen than the STOICHIOMETRIC AIR amount just described. An AIR COMPRESSION step comprises a compressor preferably for air whereby both the process air input for the secondary reformer and the refrigeration air input for the AIR REFRIGERATION step are compressed together, saving equipment costs.

In FIG. 2, The process stream passes through the SHIFT CONVERTER(S) and CARBON DIOXIDE AND METHANATION steps, wherein dryers remove traces of water vapor in the synthesis gas in the latter step prior to cryogenic separation at the PURIFIER step. The COMPRESSED AIR may advantageously comprise air, enriched air or nitrogen-enriched air, although preferably only air will be used for reduced processing costs. The COMPRESSED AIR passes to the AIR REFRIGERATION step. It is understood that the cryogenic refrigeration occurring in the AIR REFRIGERATION step comprises a dryer removing to trace levels water remaining in the feed gas prior to cooling to freezing temperatures to eliminate the condensation and freezing of water vapor in the feed gas. In addition, it is known to use several gaseous compositions for the stream labeled COMPRESSED AIR in FIG. 2 to achieve the extremely low temperatures later indicated in the examples herein. Although air is a preferable embodiment, substantially pure nitrogen, waste gas from the Purifier process or similar nitrogen-containing gases will also be useful as refrigerant gases for the present invention. The indication of a refrigeration loop using air in FIG. 2 is not a specific limitation to use of such a refrigeration gas for the external refrigeration loop of the present invention. The specific examples of this detailed description use air as the refrigeration gas composition.

Figure 5:
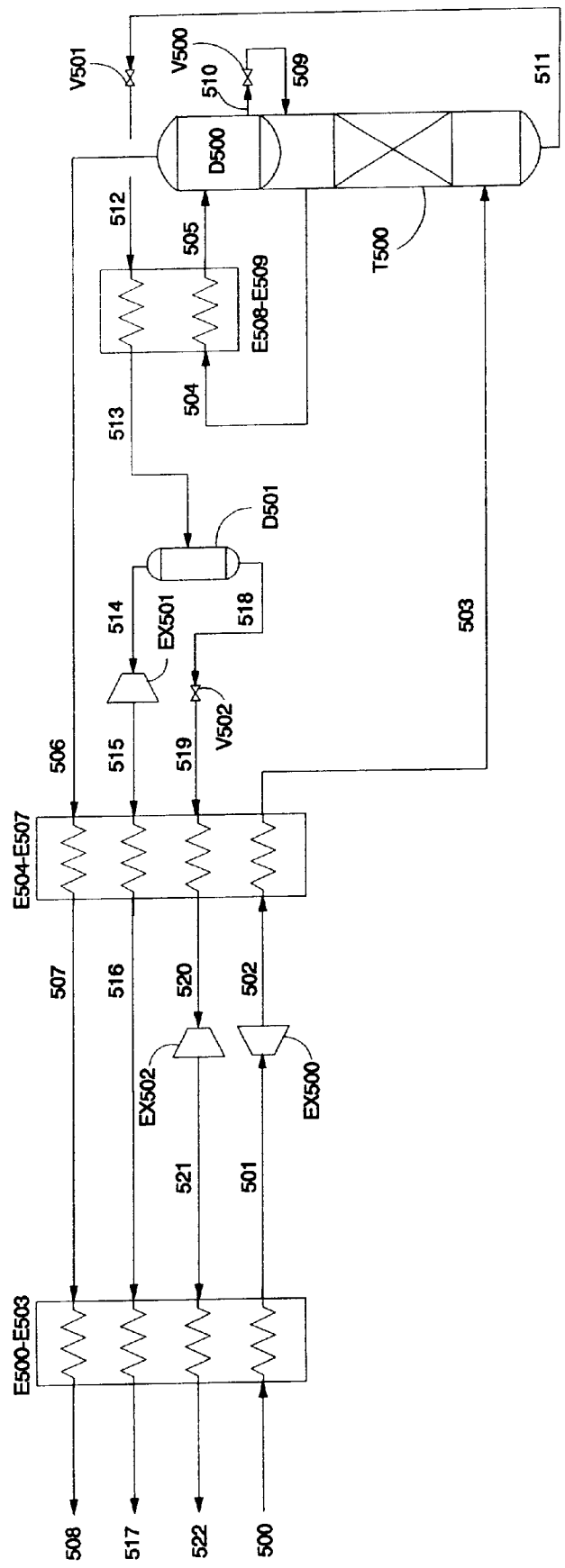
FIG. 5 shows the PURIFIER process shown in FIG. 3.
Figure 6:
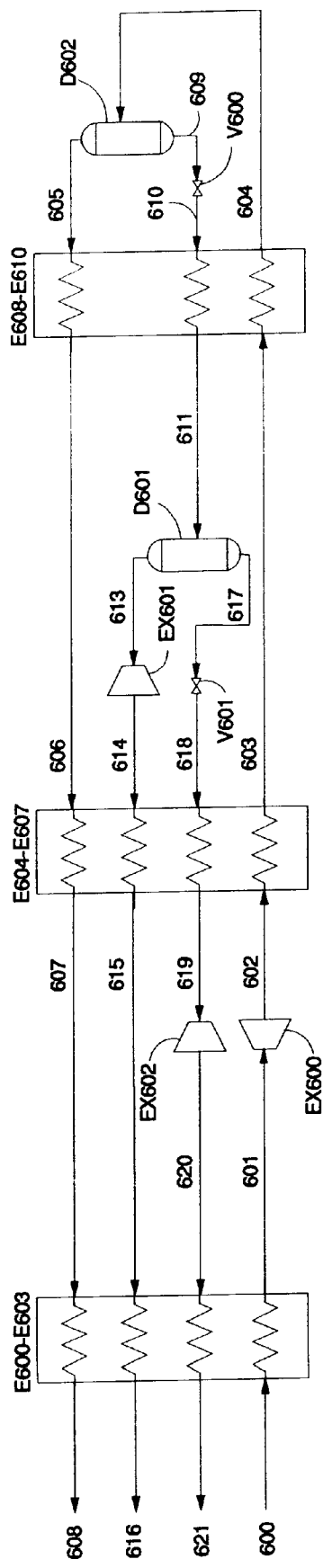
FIG. 6 shows another embodiment of the PURIFIER process shown in FIG. 3.

The AIR REFRIGERATION step of FIG. 2 comprises, in FIG. 4, the heat exchange stages E404–E406 (preferably taking place in a platefin, multistream heat exchanger), expander EX400, drum D400, valve V401 and their associated streams as described below and conditions and compositions for which are shown in Table 1. The PURIFIER step of FIG. 2 comprises, in FIG. 4, the heat exchange stages E400–E403 (preferably taking place in a platefin, multistream heat exchanger), fractionation column T400 (wherein about 5–15 theoretical stages may comprise packing or trays), dephlegmating condenser C400, valves V400 and V402 and their associated streams as described below and conditions and compositions for which are shown in Table 1. In FIGS. 4, 5 and 6, the stages of heat transfer for the streams are represented by short, vertically zigzagged lines of the multi-stream, platefin exchangers (such as for stages E400–E403). Each heat transfer stage may be individually identified such that the vertically highest line of the stages is the lowest number of the sequence, the next lowest line is the next highest number of the sequence and so on.

Stream 400 comprises a dry, compressed synthesis gas substantially free of carbon dioxide and carbon monoxide with a hydrogen to nitrogen ratio of about 2.4 with significant amounts of methane and other inerts. For simplicity, the other inerts shall be represented simply as argon in this description and in the Tables. The significance of methane and argon in the synthesis gas is well known in the art. Even quite small amounts of such non-reactants in the ammonia synthesis loop build up due to recycle of reactants, causing a higher rate of purge gas which in turn loses to the process significant amounts of nitrogen and hydrogen. It is highly valuable in terms of reactant conservation and efficiency of the ammonia synthesis loop that the methane and argon be reduced to the lowest possible level. It has been known in commercial operation that the Purifier process operating at 50 mole percent excess nitrogen will remove with the excess nitrogen all the residual methane from the synthesis gas and up to 60 mole percent of the argon in a waste gas stream with minimal loss of nitrogen and hydrogen.

Stream 400 is cooled in stage E403 to form stream 401, which fed to the bottom of column T400. The mixed phase stream 401 (about 2–3 mole percent condensed) is rectified in column T401 with reflux formed from condensation of the rectified vapor in condenser C400. Although condenser C400 is advantageously arranged and shown as a dephlegmating condenser, a separate condensing heat exchanger and phase separation drum as typically found in the prior art will accomplish the objects of the present invention for condensing reflux liquid for column T400. Stream 402 is the accumulated components of the rectifying reflux, which surprisingly comprises all the methane and at least about one fourth to about one third of the argon in the column feed. Stream 402 is flash expanded across valve V400 to autorefrigerate condenser C400 and forms stream 404 which further refrigerates feed stream 400 in stages E400–E403. The overhead vapor product of column T400 is stream 405, which now comprises the desired synthesis gas composition of about 3:1 hydrogen to nitrogen ratio. Refrigeration from stream 405 is recovered in stages E400–E403 also to the feed stream 400, and stream 405 thereby forms stream 407.

The AIR REFRIGERATION step of FIG. 2 is now discussed with reference to FIG. 4. Stream 408 comprises a relatively small flow of compressed air (the compression step is not shown in this Figure). Stream 408 flows through a control valve to form stream 409 which is cooled in stages E404–E406 to form stream 410. Stream 410 is expanded in expander EX400 to form a partially condensed stream fed to separation drum D400. The vapor from drum D400 forms stream 411, which autorefrigerates feed stream 409 in stages E404–E406 and which forms stream 412. Since this single stage of separation is performed by condensation and phase separation, stream 412 is relatively nitrogen-rich exhaust gas, in addition to obtaining a relatively higher portion of argon than the condensate portion of the air stream.

Stream 413 and 416 form the total condensate formed from the autorefrigeration of the compressed air stream 408. Stream 413 is flash expanded across valve V401, then forming stream 414, which in turn provides refrigeration to stages E404–E406 and then forms stream 415. The remaining portion of the condensate forms stream 416 which is flash expanded across valve V402 to form stream 417. The very cold temperatures achieved with that flash expansion, as shown in Table 1, perform an important portion of the refrigeration of the Purifier process of this embodiment. Stream 417 is heated in stages E400–E403 to form stream 415. As noted above regarding the nitrogen-enrichment of stream 412, streams 415 and 418 are obtain the benefit of a single stage of separation and are oxygen-enriched exhaust streams, low in argon which may be recompressed in the AIR COMPRESSION stage to enrich the oxygen content of the air to the secondary reforming step and thereby obtain greater heat recovery to the process or to steam production.

Figure 7:
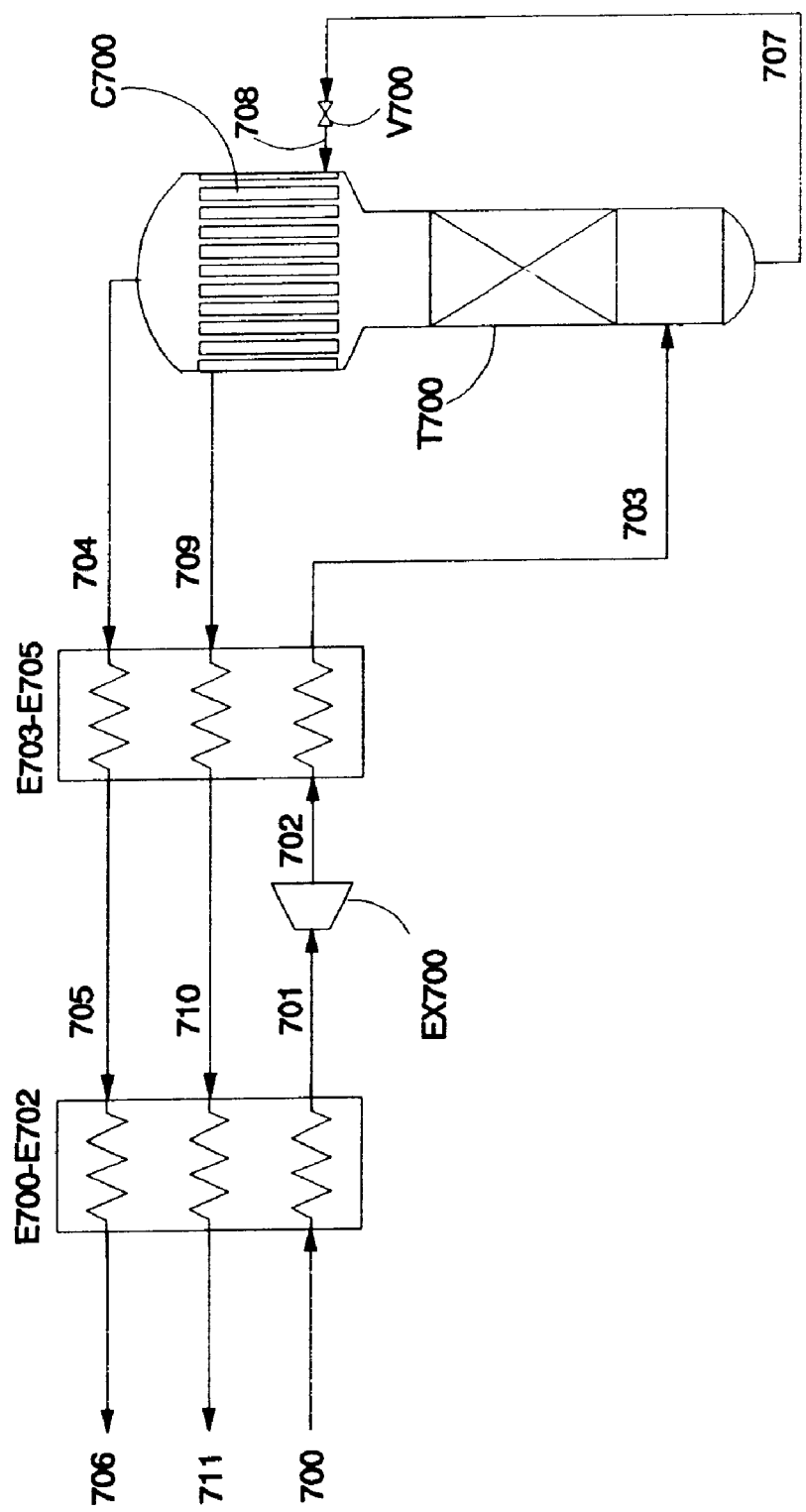
FIG. 7 shows another embodiment of the PURIFIER process wherein autorefrigeration is provided entirely by expansion of the feed gas.

The present improvement of the Purifier process requires a relatively small flow of air for refrigeration, and the refrigeration expansion is external to the process equipment and conduits that carry the synthesis gas. In comparison with the Purifier process of U.S. Pat. No. 3,442,613, this embodiment and improvement of the Purifier process comprises no expander in the process stream, as shown in FIG. 7 for stream 701, and no recompression of the synthesis gas from the expanded pressure to synthesis gas production pressure (over about 300 psia). It had not been known that such a low moderate amount of excess nitrogen (25% in this example) would result in elimination of such a significant portion of the methane in the synthesis gas (down to less than 100 ppmv, and potentially below 50 ppmv) and a comparatively significant amount of the argon (the molar reduction is about 25 mole percent of the argon entering with the process feed stream 400), which overall removal of methane and argon comprises about 50 mole percent of the components inert to the ammonia synthesis conversion downstream.

The embodiment of this example is especially advantageous for increasing synthesis gas production by at least about 10% in a plant which obtains a synthesis gas by way of one of the several methods of non-cryogenic separation for adjustment of the hydrogen to nitrogen ratio or by way of input of only sufficient nitrogen into the process to achieve a 3:1 hydrogen to nitrogen ratio.

The advantages of the Purifier process operating at 50 mole percent excess nitrogen are well known, i.e., that the higher air input to the secondary reformer dramatically increases the portion of the total hydrocarbon reforming done there, thereby reducing by that amount the primary reformer load. This load reduction for primary reforming is especially advantageous in cost saving since the primary reforming step is done by indirect heat transfer typically from fired, high temperature furnaces. In turn, plant expansion has typically been limited by the highest capacity of the primary reformer equipment. It has been found that synthesis gas plant capacity expansion is relatively easy when the present improvement of the Purifier is applied thereto. Although adding more air, enriched air or nitrogen-enriched air to the secondary reformer by way of the present invention increases the volumetric throughput of the synthesis gas production steps, the increase of such air-based streams to achieve preferably from 25–35 mole percent excess nitrogen have in the synthesis gas is manageable and the pressure drop and/or increase in compression capacity is justified by the relatively low capital cost compared to the increase in production and efficiency achieved.

It has not been known before the present invention that such a combination of increased capacity by way of increased hydrocarbon reforming at the secondary reformer with few equipment changes to accommodate increased volumetric throughput would permit sufficient excess nitrogen addition to effectively remove sufficiently large amounts of excess nitrogen and methane, argon and other inerts to justify the cost of a Purifier system of expansion, autorefrigeration and separation or fractionation. The embodiment of this example is just one of three presented herein, although the following examples achieve substantially equivalent results whereby the expansion of the process synthesis gas provides all the refrigeration needed for the objects of the present invention to be achieved.

EXAMPLE 2
Expansion of Process Synthesis Gas at 25 Mole Percent Excess Nitrogen

The present invention is now discussed with reference to FIGS. 3 and 5 and Table 2, in which table the compositions, conditions and flow rates are found. Stages E500–E503, E504–E507 and E508–E509 provide, through autorefrigeration with expanded and flashed process streams, all the required refrigeration for removal of 25 mole percent excess nitrogen, all of the methane and over 25 mole percent of argon by fractionation in column T500, in a manner similar to the process of Example 1, although feed stream 500 is expanded in expander 501 to provide direct autorefrigeration to the synthesis gas stream upstream of column T500. Stream 501, cooled in stage E500–E503, is expanded in expanded in expander EX500 and cooled further in stage E504–E507. Stream 503 is fed to the bottom of column T500 for rectification to remove the excess nitrogen, methane and argon from the synthesis gas. The liquid bottoms stream 511 from column T500 is flashed across valve V501 to form stream 512 which indirectly condenses stream 504 to form stream 505. The liquid and vapor phases of stream 505 are separated in drum D500, the liquid phase forming stream 510, which refluxes column T500 as stream 510, controlled by valve V500 to form stream 509. The partially vaporized stream 512 forms stream 513, whereby the vapor and liquid portions are separated in drum D501. The vapor portion of stream 513 forms stream 514, which is expanded in expander EX501 to form stream 515. Stream 515 is heated in stages E504–E507 to form stream 516, which stream is then heated in stages E500–E503 to form stream 517.

The liquid portion of stream 513 is stream 518, which is flashed across valve V502 to form stream 519. Stream 519 is heated in stages E504–E507 to form stream 520, which is then expanded in expander EX502 to form stream 521. Stream 521 is heated in stages E500–E503 to form stream 522. The expansion of the entire synthesis gas stream is minimized by novel application of expanders to the separate portions of stream 513 after condensing duty for column T500 has been obtained. Thus, the expansion and recompression (not shown) of the synthesis gas stream 508 acts as a method of balancing imbalances of refrigeration so that external refrigeration loops are not required.

EXAMPLE 3
Expansion of Process Synthesis Gas at 35 Mole Percent Excess Nitrogen and Expansion of Waste Gas to Provide All Auto-Refrigeration The present invention is now discussed with reference to FIGS. 3 and 6 and Table 3, in which table the compositions, conditions and flow rates are found. Stages E600–E503, E604–E607 and E608–E610 provide, through autorefrigeration with expanded and flashed process streams, all the required refrigeration for removal of 35 mole percent excess nitrogen, much of the methane and over 25 mole percent of argon by a single condensation and phase separation in drum D502. A fractionation column has been found not be needed to achieve the objects of the present invention with the embodiment of this example, indicated as preferable in Examples 1 and 2.

Stream 601, cooled in stage E600–E603, is expanded in expanded in expander EX600 and cooled further in stage E604–E607. Stream 603 is further cooled in stage E608–E610 and is then fed to drum D502 and thereby to remove by a single phase separation the excess nitrogen, methane and argon from the synthesis gas. The liquid bottoms stream 609 from drum D502 is flashed across valve V600 to form stream 610 which provides refrigeration to stage E608–E610 and then forms stream 611. The liquid and vapor phases of stream 611 are separated in drum D601, the liquid phase forming stream 617, which is then flashed across valve V601 to form stream 618. The vapor portion of stream 611 forms stream 613, which is expanded in expander EX601 to form stream 614. Stream 614 is heated in stage E604–E607 to form stream 615, which stream is then heated in stage E500–E503 to form stream 616.

Stream 618 is heated in stage E604–E607 to form stream 619, which is then expanded in expander EX602 to form stream 620. Stream 620 is heated in stage E600–E603 to form stream 621. The expansion of the entire synthesis gas stream is minimized by novel application of expanders to the separate portions of stream 611 after condensing duty for stream 604 has been obtained. Thus, the expansion and recompression (not shown) of the synthesis gas stream 608 acts as a method of balancing imbalances of refrigeration so that external refrigeration loops are not required.

EXAMPLE 4
Expansion of Process Synthesis Gas to Provide All Auto-Refrigeration

The present invention is now discussed with reference to FIG. 7, and the streams represented therein as described in Table 4. Streams 700, 701, 702, 703, 704, 705 and 706 comprise substantially the composition, flow rates and conditions of streams 500, 501, 502, 503, 506, 507 and 508 respectively. The ultimate separation performance on the synthesis gas of the process shown in FIG. 5 is thus substantially the same as that shown in FIG. 7, although provision of autorefrigeration is made entirely with synthesis gas expansion across expander EX700. The pressure drop across that expander is about 70 psi. Feed stream 700 is cooled in heat exchange stages E700–E702 to form stream 701 and that stream is expanded in expander EX700 to form stream 702. Stream 702 is cooled in stages E703–E705 to form stream 703, which is fed to column T700. It is preferable to supply about 14 theoretical stages in the several columns of this and the above examples. A bottom stream 707 from column T700 is flashed across valve 700 to form stream 708, which is used to refrigerate dephlegmating condenser C700. The heated stream 708 forms steam 709. The overhead product stream 704 from column T700 and stream 709 are heated in stages E700–E702 and E703–E705 to recover therefrom refrigeration to the synthesis gas pre-rectification cooling as streams 705, 706, 710 and 711.

Figure 8:
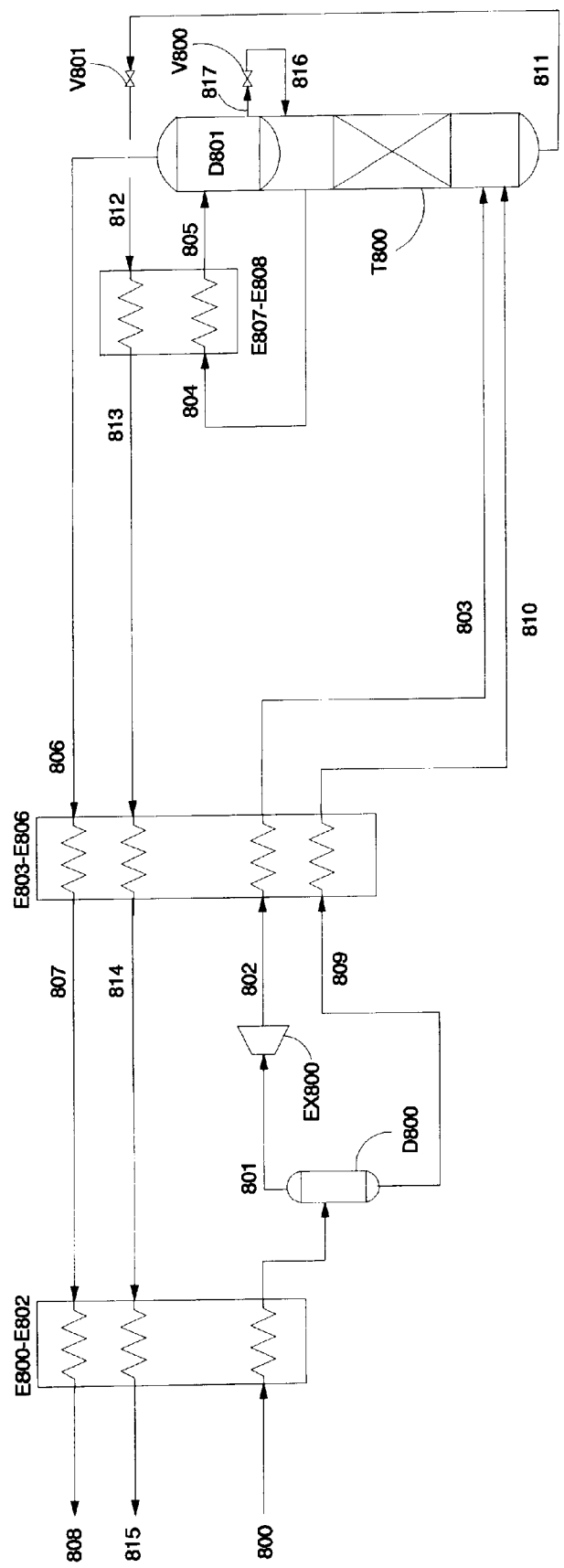
FIG. 8 is another embodiment of the present invention. The feed gas entering the first multi-stream platefin exchanger is condensed less than about 10 mole percent. A separated condensate stream is preferably subcooled in the second multi-stream platefin exchanger before feeding to the column.
Figure 9:
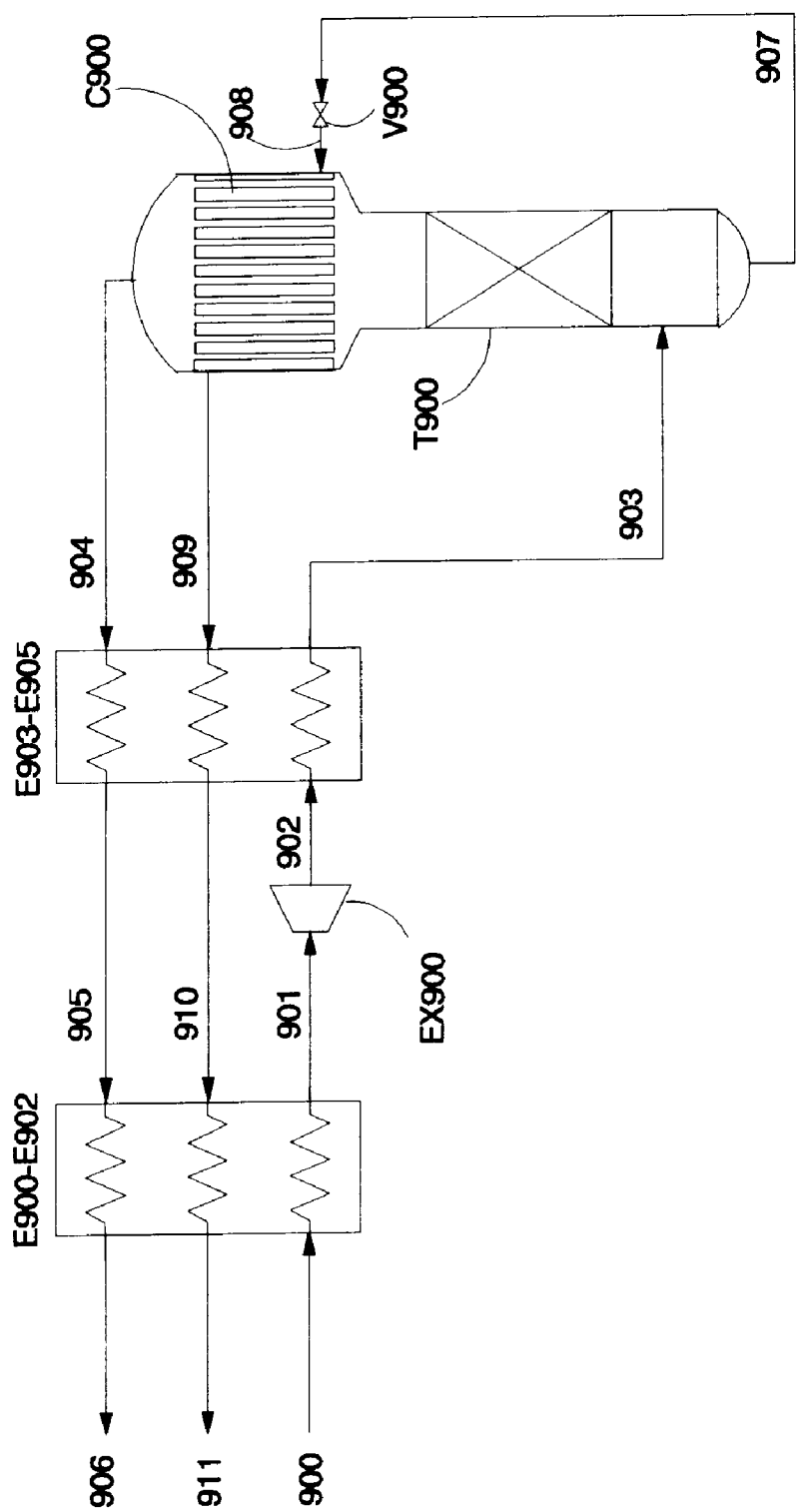
FIG. 9 is the process shown in FIG. 7, shown for comparison to the process of FIG. 8.

Another embodiment of the present invention is shown in FIG. 8 and is a further improvement as compared with an earlier embodiment, shown in FIG. 9. The process stream compositions and conditions of the streams of FIG. 8 are shown in Table 5. The process stream compositions and conditions of the streams of FIG. 9 are shown in Table 6. Feed gas 800 is cooled and partially condensed in platefin exchanger E800–E802 to be separated in drum D800 to form a gas stream 801 and condensate stream 809. Stream 809 is preferably subcooled in platefin exchanger E803–E806, but may optionally be fed directly to the bottom of column T800. Stream 801 is expanded in expander EX800 to form stream 802. Stream 802 is further cooled in platefin exchanger E803–E806 and is fed to the bottom of column T800. The theoretical stages in column T800 are preferably about 9, although more may be provided.

An overhead stream 804 is partly condensed in platefin exchanger E807–E808 and is separated in drum D801, forming synthesis gas stream 806. The bottoms product from column T800 is stream 811, which is flashed across valve V801 to form stream 812. Stream 812 provides autorefrigeration to platefin exchanger E807–E808 and emerges as stream 813. Streams 806 and 813 provide autorefrigeration in platefin exchangers E803–E806 and E800–E802 countercurrent to the warmer process streams and emerge as streams 808 and 815. Reflux to column T800 is made by transferring condensate stream 817 across valve V800 as stream 816 to the top of the theoretical stages of column T800.

The partial condensation of process gas stream 800 in the first platefin exchanger is shown in table 5 to be about 1 mole percent. The pressure drop across the expander is about 46 psia. These results are now compared with the process shown in FIG. 9.

The process of FIG. 9 is the substantial equivalent of that shown in FIG. 7, so that the stream and equipment item numbers are understood with reference to the description for FIG. 7. The pressure drop across the expander is about 77 psia. The large volume of gas to be re-compressed for the ammonia synthesis loop means that the lower pressure stream 708 forms steam 709. The overhead product stream 704 from column T700 and stream 709 are heated in stages E700–E702 and E703–E705 to recover therefrom refrigeration to the synthesis gas pre-rectification cooling as streams 705, 706, 710 and 711.

Another embodiment of the present invention is shown in FIG. 8 and is a further improvement as compared with an earlier embodiment, shown in FIG. 9. The process stream compositions and conditions of the streams of FIG. 8 are shown in Table 5. The process stream compositions and conditions of the streams of FIG. 9 are shown in Table 6. Feed gas 800 is cooled and partially condensed in platefin exchanger E800–E802 to be separated in drum D800 to form a gas stream 801 and condensate stream 809. Stream 809 is preferably subcooled in platefin exchanger E803–E806, but may optionally be fed directly to the bottom of column T800. Stream 801 is expanded in expander EX800 to form stream 802. Stream 802 is further cooled in platefin exchanger E803–E806 and is fed to the bottom of column T800. The theoretical stages in column T800 are preferably about 9, although more may be provided.

An overhead stream 804 is partly condensed in platefin exchanger E807–E808 and is separated in drum D801, forming synthesis gas stream 806. The bottoms product from column T800 is stream 811, which is flashed across valve V801 to form stream 812. Stream 812 provides autorefrigeration to platefin exchanger E807–E808 and emerges as stream 813. Streams 806 and 813 provide autorefrigeration in platefin exchangers E803–E806 and E800–E802 countercurrent to the warmer process streams and emerge as streams 808 and 815. Reflux to column T800 is made by transferring condensate stream 817 across valve V800 as stream 816 to the top of the theoretical stages of column T800.

The partial condensation of process gas stream 800 in the first platefin exchanger is shown in table 5 to be about 1 mole percent. The pressure drop across the expander is about 46 psia. These results are now compared with the process shown in FIG. 9.

The process of FIG. 9 is the substantial equivalent of that shown in FIG. 7, so that the stream and equipment item numbers are understood with reference to the description for FIG. 7. The pressure drop across the expander is about 77 psia. The large volume of gas to be re-compressed for the ammonia synthesis loop means that the lower pressure drop for the process of FIG. 8 over that of the process of FIG. 9 is surprisingly advantageous. It has not been previously known that the distribution of autorefrigeration to cause condensation in the feed gas at the first platefin exchanger could have such an effect. As is shown in tables 5 and 6, the performance of the two processes shown in FIGS. 8 and 9 is very similar for purposes of supplying a synthesis gas to the synthesis loop with relatively low methane and inerts. In addition, column T900 in FIG. 9 comprises about 19 theoretical stages to accomplish the separation done with just 9 for the process of FIG. 8.

Table 7 is provided to compare the outlet compositions and conditions of the process of the present invention with a non-Purifier, conventional ammonia plant at the outlets of the primary and secondary reformers and the methanator. These are provided for easy comparison of gas volumes and compositions. It can be seen that overall pressure drop, which was calculated for substantially the same equipment in both cases, is not significantly greater for the increased excess air of the present invention. This means that no substantial equipment is replaced with the modification for expansion by the present invention. The two processes shown in Table 7 assume typical hydrogen recovery as shown in FIG. 2 for the invention and conventional case. This hydrogen recovery usually comprises a stream of about 85 mole percent hydrogen and 15 mole percent nitrogen. Thus, the conventional process shown in Table 7 comprises a stream with excess nitrogen which is compensated by recycled hydrogen.

It is highly significant the severity (temperature) of the primary and secondary reformers is reduced with the present invention as shown in Table 7. In addition, the present invention therefor allows for far higher methane content in the process gas stream, which methane can be removed at the moderate excess air Purifier column. In summation, the present invention can provide at least or more than 10% or more additional capacity for the conventional plant without replacement of the primary or secondary reformers, the shift reactors, the CO2 removal equipment or the methanator. Some minor mechanical adaptations will be desirable since a shutdown of such a facility will make such changes economical, but the present invention achieves a truly dramatic capacity increase with minor equipment purchase or process complexity.

Table 7 also discloses the methane content of the methanator effluent (on a dry basis) is about 0.5 mole percent versus 0.25 mole percent for the capacity expansion of the present invention compared to the conventional operation of the non-Purifier plant. Such relaxation was not thought previously economical nor proposed by the prior art in capacity expansion of a non-Purifier plant. The moderate excess air Purifier fractionation removes about 25 percent of the feed gas argon and almost all of the feed gas methane. All this without substantial replacement of the primary or secondary reformers, the shift reactors, carbon dioxide removal equipment or the methanator, individually or together. The conventional, non-Purifier plant will typically produce ammonia synthesis gas with methane content of about 0.5 to over 1.0 mole percent methane.

The provision of an increased overall output from the primary and reforming steps were provided by the present invention with no substantial change or equipment size or replacement. It has been found that at least about 10% increase in synthesis gas production is obtained with relatively little capital expense and a dramatic increase in the efficiency and reliability (from summer to winter variations) may also be obtained. The addition of the present invention to an existing plant using conventional or membrane separators for excess nitrogen removal has not heretofor been known or contemplated. Optimum design options will sometimes present the skilled person with considerable and wide ranges from which to choose appropriate process modifications for the above examples. However, the objects of the present invention will still be obtained by the skilled person applying such design options in an appropriate manner.

TABLE 1

| Stream | 400 | 401 | 402 | 403 | 404 | 405 | 406 | 407 | 408 | 409 |
|---|---|---|---|---|---|---|---|---|---|---|
| Temp., °F. | 40 | −289 | −289 | −308 | −298 | −295 | 35 | 35 | 95 | |
| Press., psia | 341 | — | 336 | 35 | 32 | 331 | 35 | 326 | 540 | |
| Flow, lb − mol/hr | 23472.5 | 23472.5 | 1712.4 | 1712.4 | 1712.4 | 22030.1 | 1712.4 | 22030.1 | 1910.0 | 1910.0 |
| Mole Percent | | | | | | | | | | |
| Hydrogen | 69.79 | 69.79 | 5.14 | 5.14 | 5.14 | 74.82 | 5.14 | 74.82 | 77.74 | 77.74 |
| Nitrogen | 29.17 | 29.17 | 89.59 | 89.59 | 89.59 | 24.87 | 89.59 | 24.87 | 21.33 | 21.33 |
| Oxygen | | | | | | | | | | |
| Argon | 0.40 | 0.40 | 1.54 | 1.54 | 1.54 | 0.32 | 1.54 | 0.32 | 0.93 | 0.93 |
| Methane | 0.63 | 0.63 | 8.74 | 8.74 | 8.74 | | 8.74 | | | |

| Stream | 410 | 411 | 412 | 413 | 414 | 415 | 416 | 417 | 418 |
|---|---|---|---|---|---|---|---|---|---|
| Temp., °F. | −220 | −291 | 91 | −291 | — | 91 | −291 | — | 35 |
| Press., psia | 535 | 60 | 54 | 60 | 35 | 30 | 60 | 27 | 22 |
| Flow, lb − mol/hr | 1910.0 | 1472.5 | 1472.5 | 267.5 | 267.5 | 267.5 | 170.0 | 170.0 | 170.0 |
| Mole Percent | | | | | | | | | |
| Hydrogen | | | | | | | | | |
| Nitrogen | 77.74 | 81.17 | 81.17 | 65.17 | 65.17 | 65.17 | 65.17 | 65.17 | 65.17 |
| Oxygen | 21.33 | 17.99 | 17.99 | 32.56 | 32.56 | 32.56 | 32.56 | 32.56 | 32.56 |
| Argon | 0.93 | 0.84 | 0.84 | 1.27 | 1.27 | 1.27 | 1.27 | 1.27 | 1.27 |
| Methane | | | | | | | | | |

TABLE 2

| Stream | 500 | 501 | 502 | 503 | 504 | 505 | 506 | 507 |
|---|---|---|---|---|---|---|---|---|
| Temp., °F. | 40 | −245 | −250 | −288 | −290 | −294 | −294 | −255 |
| Press., psia | 498 | 396 | 365 | 363 | 359 | 357 | 357 | 355 |
| Flow, lb − mol/hr | | | | | | | 22030.1 | 22030.1 |
| Mole Percent | | | | | | | | |
| Hydrogen | 69.79 | 69.79 | 69.79 | 69.79 | | | 74.82 | 74.82 |
| Nitrogen | 29.17 | 29.17 | 29.17 | 29.17 | | | 24.87 | 24.87 |
| Oxygen | | | | | | | | |
| Argon | 0.40 | 0.40 | 0.40 | 0.40 | | | 0.32 | 0.32 |
| Methane | 0.63 | 0.63 | 0.63 | 0.63 | | | | |

TABLE 2-continued

| Stream | 508 | 509 | 510 | 511 | 512 | 513 | 514 | 515 |
|---|---|---|---|---|---|---|---|---|
| Temp ° F. | 34 | −294 | −294 | −288 | −301 | −294 | −294 | −313 |
| Press., psia | 353 | 359 | 357 | 353 | 55 | 53 | 53 | 21 |
| Flow, lb − mol/hr | 22030.1 | | | 1712.4 | 1712.4 | 1712.4 | 1181.6 | 1181.6 |
| Mole Percent | | | | | | | | |
| Hydrogen | 74.82 | | | 5.14 | 5.14 | 5.14 | 8.6 | 8.6 |
| Nitrogen | 24.87 | | | 89.59 | 89.59 | 89.59 | 88.3 | 88.3 |
| Oxygen | | | | | | | | |
| Argon | 0.32 | | | 1.54 | 1.54 | 1.54 | 1.5 | 1.5 |
| Methane | | | | 8.74 | 8.74 | 8.74 | 1.6 | 1.6 |

| Stream | 516 | 517 | 518 | 519 | 520 | 521 | 522 |
|---|---|---|---|---|---|---|---|
| Temp., ° F. | −256 | 34 | — | −301 | −256 | −276 | 34 |
| Press., psia | 19 | 17 | — | 35 | 33 | 21 | 19 |
| Flow, lb − mol/hr | 1181.6 | 1181.6 | 649.7 | 649.7 | 649.7 | 649.7 | 649.7 |
| Mole Percent | | | | | | | |
| Hydrogen | 8.6 | 8.6 | 0.08 | 0.08 | 0.08 | 0.08 | 0.08 |
| Nitrogen | 88.3 | 88.3 | 74.0 | 74.0 | 74.0 | 74.0 | 74.0 |
| Oxygen | | | | | | | |
| Argon | 1.5 | 1.5 | 2.2 | 2.2 | 2.2 | 2.2 | 2.2 |
| Methane | 1.6 | 1.6 | 23.7 | 23.7 | 23.7 | 23.7 | 23.7 |

TABLE 3

| Stream | 600 | 601 | 602 | 603 | 604 | 605 | 606 | 607 |
|---|---|---|---|---|---|---|---|---|
| Temp., ° F. | 40 | −245 | −250 | −288 | −292 | −292 | −292 | −254 |
| Press., psia | 498 | 396 | 365 | — | 361 | 361 | 359 | 357 |
| Flow, lb − mol/hr | 23472.5 | 23472.5 | 23472.5 | 23472.5 | 23472.5 | 15640.9 | 15640.9 | 15640.9 |
| Mole Percent | | | | | | | | |
| Hydrogen | 69.79 | 69.79 | 69.79 | 69.79 | 69.79 | 74.5 | 74.5 | 74.5 |
| Nitrogen | 29.17 | 29.17 | 29.17 | 29.17 | 29.17 | 24.9 | 24.9 | 24.9 |
| Oxygen | | | | | | | | |
| Argon | 0.40 | 0.40 | 0.40 | 0.40 | 0.40 | 0.38 | 0.38 | 0.38 |
| Methane | 0.63 | 0.63 | 0.63 | 0.63 | 0.63 | 0.15 | 0.15 | 0.15 |

| Stream | 608 | 609 | 610 | 611 | 613 | 614 | 615 | 616 |
|---|---|---|---|---|---|---|---|---|
| Temp., ° F. | 34 | −292 | −300 | −292 | −292 | −314 | 254 | 34 |
| Press., psia | 355 | 361 | 66 | 64 | 64 | 21 | 19 | 17 |
| Flow, lb − mol/hr | 15640.9 | 1241.9 | 1241.9 | 1241.9 | 866 | 866 | 866 | 866 |
| Mole Percent | | | | | | | | |
| Hydrogen | 74.5 | 5.9 | 5.9 | 5.9 | 8.5 | 8.5 | 8.5 | 8.5 |
| Nitrogen | 24.9 | 87.5 | 87.5 | 87.5 | 88.9 | 86.9 | 88.9 | 88.9 |
| Oxygen | | | | | | | | |
| Argon | 0.38 | 1.7 | 1.7 | 1.7 | 1.6 | 1.6 | 1.6 | 1.6 |
| Methane | 0.15 | 4.7 | 4.7 | 4.7 | 1.0 | 1.0 | 1.0 | 1.0 |

| Stream | 617 | 618 | 619 | 620 | 621 |
|---|---|---|---|---|---|
| Temp., ° F. | −292 | −303 | −254 | −274 | 34 |
| Press., psia | 64 | 35 | 33 | 21 | 19 |
| Flow, lb − mol/hr | 375.8 | 375.8 | 375.8 | 375.8 | 375.8 |
| Mole Percent | | | | | |
| Hydrogen | 0.1 | 0.1 | 0.1 | 0.1 | 0.1 |
| Nitrogen | 84.1 | 84.1 | 84.1 | 84.1 | 84.1 |
| Oxygen | | | | | |
| Argon | 2.2 | 2.2 | 2.2 | 2.2 | 2.2 |
| Methane | 13.3 | 13.3 | 13.3 | 13.3 | 13.3 |

TABLE 4

| Stream | 700 | 701 | 702 | 703 | 704 | 705 | 706 | 707 |
|---|---|---|---|---|---|---|---|---|
| Temp., ° F. | 40 | −281 | −289 | −293 | −295 | −292 | 33 | −293 |
| Press., psia | 341 | 337 | 276 | 274 | 270 | 268 | 266 | 274 |
| Flow, lb − mol/hr | 23472.5 | 23472.5 | 23472.5 | 23472.5 | 22030.1 | 22030.1 | 22030.1 | 1712.4 |
| Mole Percent | | | | | | | | |

TABLE 4-continued

| Hydrogen | 69.79 | 69.79 | 69.79 | 69.79 | 74.82 | 74.82 | 74.82 | 5.14 |
| --- | --- | --- | --- | --- | --- | --- | --- | --- |
| Nitrogen | 29.17 | 29.17 | 29.17 | 29.17 | 24.87 | 24.87 | 24.87 | 89.59 |
| Oxygen | | | | | | | | |
| Argon | 0.40 | 0.40 | 0.40 | 0.40 | 0.32 | 0.32 | 0.32 | 1.54 |
| Methane | 0.63 | 0.63 | 0.63 | 0.63 | | | | 8.74 |

| Stream | 708 | 709 | 710 | 711 |
| --- | --- | --- | --- | --- |
| Temp., °F. | −307 | −301 | −294 | 33 |
| Press., psia | 36 | 33 | 31 | 29 |
| Flow, lb − mol/hr | 1712.4 | 1712.4 | 1712.4 | 1712.4 |
| Mole Percent | | | | |
| Hydrogen | 5.14 | 5.14 | 5.14 | 5.14 |
| Nitrogen | 89.59 | 89.59 | 89.59 | 89.59 |
| Oxygen | | | | |
| Argon | 1.54 | 1.54 | 1.54 | 1.54 |
| Methane | 8.74 | 8.74 | 8.74 | 8.74 |

TABLE 5

| Stream | 800 | 801 | 802 | 803 | 806 | 807 |
| --- | --- | --- | --- | --- | --- | --- |
| Temp., °F. | 40 | −285 | −289.2 | −292.3 | −299.4 | −294.1 |
| Press., psia | 341 | 337 | 291 | 289 | 283 | 281 |
| Flow, lb − mol/hr | 23148.9 | 23552.4 | 23552.4 | 23552.4 | 22030.2 | 22030.2 |
| Mole Percent | | | | | | |
| Hydrogen | 69.48 | 70.30 | 70.30 | 70.30 | 74.87 | 74.87 |
| Nitrogen | 29.12 | 28.56 | 28.56 | 28.56 | 24.81 | 24.81 |
| Oxygen | | | | | | |
| Argon | 0.40 | 0.39 | 0.39 | 0.39 | 0.31 | 0.31 |
| Methane | 1.00 | 0.75 | 0.75 | 0.75 | 0.01 | 0.01 |

| Stream | 808 | 809 | 810 | 811 | 812 | 813 | 814 | 815 |
| --- | --- | --- | --- | --- | --- | --- | --- | --- |
| Temp., °F. | 35.5 | −285 | −292.3 | −292.3 | −309 | −301.7 | −294.1 | 35.5 |
| Press., psia | 279 | 337 | 335 | 335 | 35 | 33 | 31 | 29 |
| Flow, lb − mol/hr | 22030.2 | 297.8 | 297.8 | 1820 | 1820 | 1820 | 1820 | 1820 |
| Mole Percent | | | | | | | | |
| Hydrogen | 74.87 | 4.40 | 4.40 | 4.14 | 4.14 | 4.14 | 4.14 | 4.14 |
| Nitrogen | 24.81 | 73.47 | 73.47 | 81.31 | 81.31 | 81.31 | 81.31 | 81.31 |
| Oxygen | | | | | | | | |
| Argon | 0.31 | 1.58 | 1.58 | 1.54 | 1.54 | 1.54 | 1.54 | 1.54 |
| Methane | 0.01 | 20.55 | 20.55 | 13.01 | 13.01 | 13.01 | 13.01 | 13.01 |

TABLE 6

| Stream | 900 | 901 | 902 | 903 | 904 | 905 | 906 | 907 |
| --- | --- | --- | --- | --- | --- | --- | --- | --- |
| Temp., °F | 40 | −282.5 | −289.5 | −293.8 | −298.7 | −292 | 32 | −293.8 |
| Press., psia | 341 | 337 | 266 | 264 | 259 | 257 | 255 | 264 |
| Flow, lb − mol/hr | 23148.9 | 23148.9 | 23148.9 | 23148.9 | 22030.2 | 22030.2 | 22030.2 | 1820 |
| Mole Percent | | | | | | | | |
| Hydrogen | 69.48 | 69.48 | 69.48 | 69.48 | 74.87 | 74.87 | 74.87 | 4.14 |
| Nitrogen | 29.12 | 29.12 | 29.12 | 29.12 | 24.81 | 24.81 | 24.81 | 81.31 |
| Oxygen | | | | | | | | |
| Argon | 0.40 | 0.40 | 0.40 | 0.40 | 0.31 | 0.31 | 0.31 | 1.54 |
| Methane | 1.00 | 1.00 | 1.00 | 1.00 | 0.01 | 0.01 | 0.01 | 13.01 |

| Stream | 908 | 909 | 910 | 911 |
| --- | --- | --- | --- | --- |
| Temp., °F. | −308 | −302.3 | −292 | 32 |
| Press., psia | 36 | 33 | 31 | 29 |
| Flow, lb − mol/hr | 1820 | 1820 | 1820 | 1820 |
| Mole Percent | | | | |
| Hydrogen | 4.14 | 4.14 | 4.14 | 4.14 |
| Nitrogen | 81.31 | 81.31 | 81.31 | 81.31 |
| Oxygen | | | | |
| Argon | 1.54 | 1.54 | 1.54 | 1.54 |
| Methane | 13.01 | 13.01 | 13.01 | 13.01 |

TABLE 7

| Stream | Invention Primary Reformer Effluent | Invention Secondary Reformer Effluent | Invention Methanator Effluent | Non-Purifier Primary Reformer Effluent | Non-Purifier Secondary Reformer Effluent | Non-Purifier Methanator Effluent |
|---|---|---|---|---|---|---|
| Temp., ° C. | 770 | 943 | 354 | 801 | 976 | 364 |
| Press., kgf/cm2 | 32.84 | 32.52 | 25.57 | 32.58 | 32.2 | 27.5 |
| Flow, kg – mol/hr | 6648.96 | 9687.7 | 5997.57 | 6764.90 | 9033.23 | 5263.00 |
| Kg – moles/hr | | | | | | |
| Hydrogen | 2415.29 | 3425.44 | 4089.36 | 2612.48 | 3190.51 | 3746.20 |
| Nitrogen | 17.30 | 1713.25 | 1709.51 | 15.35 | 1355.14 | 1352.19 |
| Oxygen | | | | | | |
| Argon | 20.42 | 20.42 | 20.42 | | 16.13 | 16.13 |
| CO | 285.32 | 796.14 | | 342.77 | 709.62 | |
| CO2 | 394.82 | 494.92 | | 400.47 | 450.09 | |
| Methane | 32.46 | 32.46 | 64.96 | 430.31 | 14.35 | 50.02 |
| Water | 2893.50 | 3195.10 | 113.42 | 2963.53 | 3297.39 | 98.47 |

We claim:

1. A process for expansion of capacity of an ammonia plant using separate methane feeds to an indirectly heated primary reforming step and to a directly heated secondary reforming step wherein before capacity expansion the secondary reformer step is fed a first combined stream of primary reforming step effluent, methane and air wherein the air is less than 25 mole percent excess air based on the methane in the first combined stream and after capacity expansion the first combined stream comprises 25 to 35 more percent excess air based on the methane in the first combined stream, whereafter the secondary reforming step effluent passes at least through steps for shift reaction, carbon dioxide removal, methanation, and drying to form a dry feed gas and then is rectified by autorefrigeration with at least about nine stages of separation to provide as an overhead product an ammonia synthesis gas with a hydrogen to nitrogen molar ratio of about 3.0, although before capacity expansion the ammonia plant comprised no cryogenic rectification for effluent from the secondary reforming step, wherein the dry feed gas is cooled in a first cooling step, wherein a condensate is formed with above about one mole percent of the feed gas, the condensate then being fed to the bottom of the separation stages and the balance of the feed gas is expanded in an expander and further cooled and fed to the bottom of the separation stages.

2. The process of claim 1 wherein the condensate is subcooled in a second cooling step with the expanded portion of the balance of the feed gas.

3. The process of claim 2 wherein the first and second cooling steps are cooled entirely by an overhead product stream from the separation stages and a flashed bottoms waste gas stream from the bottom of the separation stages.

* * * * *